Sept. 4, 1928.
C. MACKERT
1,683,562
PULLEY ATTACHMENT
Filed Dec. 12, 1925
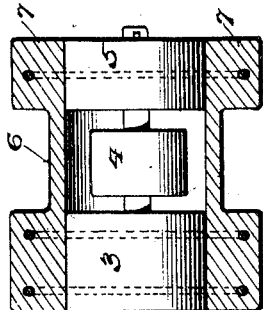
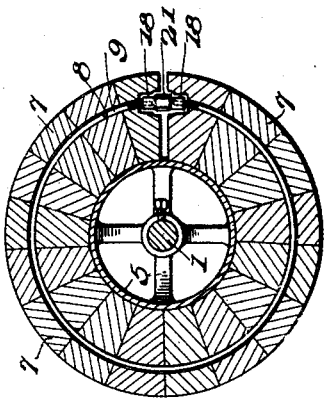
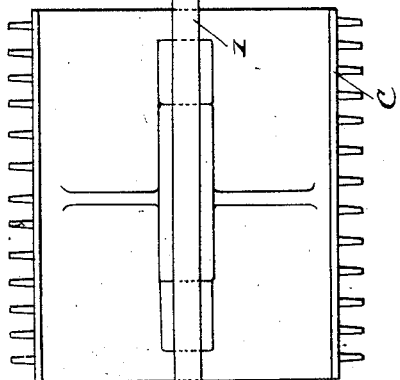
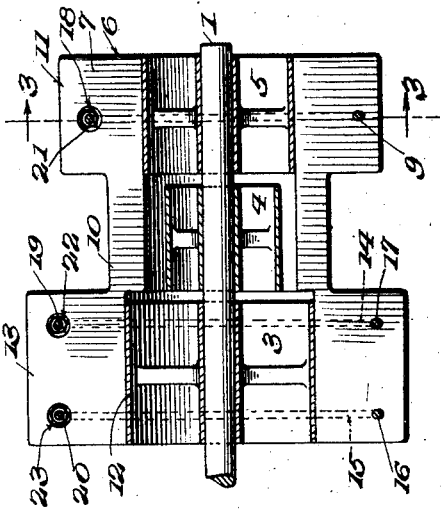
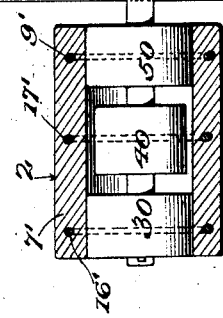
WITNESSES
W. A. Williams.
INVENTOR
Charles Mackert.
BY
ATTORNEYS Patented Sept. 4, 1928.

1,683,562

UNITED STATES PATENT OFFICE.

CHARLES MACKERT, OF ST. ANTHONY, IDAHO

PULLEY ATTACHMENT.

Application filed December 12, 1925. Serial No. 75,146.

My invention relates generally to improvements in pulley attachments, more particularly to a sleeve covering for a pulley or for a series of axially aligned adjacent pulleys, and it consists in the combinations, constructions and arrangements herein described and claimed.

An object of the invention is the provision of an attachment for the pulleys on the cylinder carrying shaft of a grain thrasher or separator, whereby the effective diameter of the pulleys on the cylinder shaft will be increased and the thrasher or separator will be adapted for use as a pea and bean huller.

A further object of the invention is the provision of a pulley attachment of the character described which can be quickly and easily secured on a pulley or a plurality of axially aligned adjacent pulleys, and as quickly and easily removed from the pulley or pulleys when desired.

A further object of the invention is the provision in an attachment of the character described of a sleeve covering for pulleys, comprising a series of segmental sections and a simple and reliable means connecting the sections and releasably holding the sections in place on the periphery of a pulley.

Other objects and advantages of the invention will be apparent from the following description, considered in conjunction with the accompanying drawings, in which Figure 1 is a view mainly in vertical section and partly in side elevation, showing sleeve coverings formed according to the invention and applied to the pulleys on the end portions of the thrasher cylinder supporting shaft, Figure 2 is a relatively enlarged fragmentary view, showing the pulleys and the sleeve covering thereon at one end of the shaft exhibited in Figure 1, the pulleys and their sleeve covering being shown in vertical section, and Figure 3 is a sectional view substantially along the line 3—3 of Figure 2.

The cylinder of a grain separator or thrasher of any one of a plurality of well known constructions, commonly in use, is driven too rapidly to permit the use thereof in the operation of hulling peas or beans since cracking of the peas or beans would result from the attempted use of a grain separator or thrasher having a cylinder rotating at normal speed as a huller for peas and beans. It is desirable in order that a grain thrasher or separator may be adapted for use as a pea or bean huller that the speed of rotation of the cylinder be reduced considerably and that the remaining rotating parts of the thrasher or separator which cooperate with the cylinder, such as the fan or blower, the feeder and the separator drive, should be driven at speeds which are approximately normal. To this end, the invention provides an attachment for the pulleys of the opposite end portions of the cylinder supporting shaft, whereby the effective diameter of all the pulleys on the shaft will be increased and the cylinder then will rotate at a greatly reduced speed when a torque is transmitted to the shaft through one of the enlarged pulley units. At the same time, belt connections from the enlarged pulley assemblies will result in the driving of associated parts at approximately normal speeds.

In Figure 1, the numeral 1 designates a shaft on which a thrasher cylinder C is mounted to rotate with the shaft. One end portion of the shaft 1 carries the pulleys 30, 40 and 50 while the other end portion of the shaft carries the pulleys 3, 4 and 5. It of course will be understood that in actual practice, the cylinder C will be housed within the body or casing or a thrasher or separator and that the end portions of the shaft 1 with the pulleys thereon will be disposed at opposite sides of the body of the thrasher or separator. In the ordinary use of such thrasher or separator, the pulley 30 may be used to transmit motion through a suitable belt connection, not shown, to a fan and the remaining pulleys 40, 50, 4 and 5 may be connected in a like manner to other parts of the thrasher or separator which are to be driven, the pulley 3 being the one to which a torque is transmitted from a source of driving power for the purpose of rotating the shaft 1 and the cylinder thereon. The number of pulleys on the end portions of the cylinder supporting shaft and the size of such pulleys may vary according to the type of thrasher or separator with which such shaft and cylinder are used, the particular arrangement of cylinder, cylinder supporting shaft and pulleys on the end portions of the shaft exhibited in Figure 1 being that which may be found in a grain thrasher of a well known construction.

The invention therefore provides a sleeve covering generally indicated at 2 for the pulleys, 30, 40 and 50 on one end portion of the shaft 1 and a sleeve covering indicated generally at 6 for the pulleys 3, 4 and 5, which are on the opposite end portion of the shaft 1. The sleeve coverings 2 and 6 are alike in essential respects. The sleeve covering 6 shown in detail in Figures 2 and 3 and the following description of the sleeve covering 6 may be considered as applying also to the construction of the sleeve covering 2. Such structural differences between the sleeve coverings 2 and 6 as appear in Figure 1 of the drawings will be hereinafter referred to.

The sleeve covering 6 is made up of a series of arcuate segmental sections 7 extending completely around the pulleys 3, 4 and 5, the individual sections 7 extending transversely across the aligned pulleys 3, 4 and 5 so that the end faces of the sections 7 of the sleeve covering respectively are substantially flush with the remote edges of the rim portions of the pulleys 3 and 5.

The sections 7 preferably are formed of wood. These sections have openings 8 formed therethrough between radial faces thereof and the openings 8 of the respective sections 7 will register and form a substantially circular opening for the reception of a flexible clamping band or wire 9 when the sections 7 are arranged in a circular series about the peripheries of the pulleys 3, 4 and 5, as best seen in Figure 3. By referring to Figures 1 and 2, it will be obvious that the sections 7 are cut-away at their outer sides transversely thereof as indicated at 10 and 11, the recess that is defined by the cut-away portion 10 being located intermediate the ends of the sections and being of greater depth than the cut-away portion indicated at 11. Also, it will be observed that each section 7 of the sleeve covering has a cut-away portion at its inner side as indicated at 12, whereby the inner diameter of the portion of the sleeve which has the greater outer diameter also will be greater than the inner diameter of the remainder of the sleeve 6. Moreover, the outer diameter of the middle portion of the sleeve 6 will be less than the outer diameters of the respective end portions of the sleeve 6 and the outer diameter of the portion of the sleeve 6 that is composed of the end portions of the sections 7 that are cut-away at 11 will be less than the outer diameter of the other end portion of the sleeve, said last named end portion of the sleeve 6 being indicated at 13. The hereinbefore mentioned openings 8 are formed in the end portions of the sections 7 which have the cut-away portions 11. The other end portions of the sections 7 also may have openings indicated at 14 and 15 respectively formed therethrough between radial faces thereof, respective openings 15 registering to form a substantially circular opening for the reception of a flexible clamping wire 16 and the openings 14 registering to form a substantially circular opening for the reception of a clamping wire 17 when the sections 7 are arranged in a series about the peripheries of the pulley sleeves 4 and 5. Two adjacent sections 7 have the adjacent ends of the openings 8, 14 and 15, respectively enlarged, as indicated at 18, 19 and 20, respectively. A sleeve coupling or nut 21 is partially received in the notched end portions 18 of the openings 8 in adjacent sections 7 and is in threaded engagement with the ends of the clamping member 9, whereby the ends of the clamping member 9 are adjustably connected. A similar sleeve coupling or nut 22 adjustably connects the ends of the clamping member 19. The ends of the sleeve coupling 22 are received in the enlarged end portions 19 of adjacent openings 14 of said two adjacent sections 7. A third sleeve nut 23 adjustably connects the ends of the clamping member 15 and the ends of the sleeve coupling 23 extend into the enlarged portions 20 of the openings 15 in said two adjacent sections 7.

The sleeve covering 2 will be formed of arcuate segmental sections 7' which are connected by clamping wires 16', 17' and 9'. The clamping members 16', 17' and 9' have the ends thereof adjustably connected by coupling nuts, not shown, similar to those which connect the ends of the clamping members 16, 17 and 9. The sections 7' may differ from the sections 7 in that the sleeve covering 2 has the outer periphery thereof formed to have the same diameter from one end of the sleeve covering 2 to its opposite end, and the sleeve covering 2 also may be uniform in inner diameter throughout its length, instead of having stepped portions.

From the foregoing description of the various parts of the device, the operation thereof may be readily understood. When the shaft 1 is driven by motion transmitted thereto as a result of the movement of a belt not shown, which may be employed to connect the larger end portion 13 of the sleeve covering 6 with a rotary driving member, the cylinder C will be turned at a speed which is considerably less than that at which said cylinder would be turned during the use thereof as a part of a grain thrasher or separator. However, the rotary parts which are driven by reason of connections between such rotary parts and the remaining portions of the sleeve covering 6 and with the sleeve covering 2 will be driven at speeds which are approximately normal. A thrasher or separator which includes the cylinder C and the shaft 1 and which has sleeve coverings embodying the invention applied to the pulley or pulleys on opposite end portions of the shaft 1 thus will be adapted for use as a pea or bean huller. It is obvious that the sleeve coverings embodying the invention may be formed as required to adapt them to fit on pulleys of different sizes and each on a single pulley or on a given number of pulleys without departing from the spirit and scope of the invention.

I claim:—

A sleeve covering for pulleys comprising a plurality of segmental sections, adjustable means connecting said sections in series on the periphery of a pulley and operable to clamp said sections to the periphery of said pulley, said sections being formed so that the sleeve covering which is comprised by the sections will consist of a plurality of portions having different outer diameters.

CHARLES MACKERT.